(12) United States Patent
Butler et al.

(10) Patent No.: US 11,178,281 B2
(45) Date of Patent: Nov. 16, 2021

(54) COMMUNICATION RESOURCE ALLOCATION

(71) Applicant: INTERNATIONAL BUSINESS MACHINES CORPORATION, Armonk, NY (US)

(72) Inventors: Christopher John Butler, Hawthorn East (AU); Ross Judd, St Leonards (AU); Timothy M. Lynar, Melbourne (AU); Shaila Pervin, Docklands (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 184 days.

(21) Appl. No.: 16/292,614

(22) Filed: Mar. 5, 2019

(65) Prior Publication Data

US 2020/0288016 A1    Sep. 10, 2020

(51) Int. Cl.
*H04M 3/51*    (2006.01)
*H04M 3/42*    (2006.01)

(52) U.S. Cl.
CPC ..... *H04M 3/5175* (2013.01); *H04M 3/42382* (2013.01); *H04M 2203/401* (2013.01); *H04M 2203/408* (2013.01)

(58) Field of Classification Search
None
See application file for complete search history.

(56) References Cited

U.S. PATENT DOCUMENTS

| | | | |
|---|---|---|---|
| 9,386,152 B2 | 7/2016 | Riahi et al. | |
| 9,559,993 B2 | 1/2017 | Palakovich et al. | |
| 10,554,817 B1* | 2/2020 | Sullivan | G06N 5/02 |
| 2014/0270138 A1* | 9/2014 | Uba | H04M 3/5233 |
| | | | 379/265.06 |
| 2017/0116177 A1 | 4/2017 | Walia | |
| 2017/0324866 A1 | 11/2017 | Segre et al. | |
| 2018/0007102 A1* | 1/2018 | Klein | H04L 65/1026 |
| 2018/0007204 A1* | 1/2018 | Klein | H04L 67/22 |
| 2018/0183929 A1* | 6/2018 | Fang | H04M 3/5166 |
| 2019/0141191 A1* | 5/2019 | Kwak | G06F 40/00 |
| 2019/0158666 A1* | 5/2019 | St-Cyr | G06Q 30/01 |
| 2019/0325868 A1* | 10/2019 | Lecue | G10L 15/22 |

\* cited by examiner

*Primary Examiner* — Harry S Hong
(74) *Attorney, Agent, or Firm* — Cantor Colburn LLP; Joseph Petrokaitis (57) ABSTRACT

A technique relates to communication resource allocation. A computer system monitors a communication between a conversational entity communication channel and a user device. A type of the communication associated with the user device is determined based on the communication. A replacement communication channel to replace the conversational entity communication channel is determined, in response to the type of the communication. The replacement communication channel is coupled to the user device in place of the conversational entity communication channel.

17 Claims, 7 Drawing Sheets

MONITOR, BY A MONITORING COMPUTER SYSTEM, A COMMUNICATION BETWEEN A CONVERSATIONAL ENTITY COMMUNICATION CHANNEL AND A USER DEVICE 402

DETERMINE A TYPE OF THE COMMUNICATION ASSOCIATED WITH THE USER DEVICE BASED N THE COMMUNICATION 404

DETERMINE A REPLACEMENT COMMUNICATION CHANNEL TO REPLACE THE CONVERSATIONAL ENTITY COMMUNICATION CHANNEL, IN RESPONSE TO THE TYPE OF THE COMMUNICATION BEING A NEGATIVE COMMUNICATION 406

COUPLE THE REPLACEMENT COMMUNICATION CHANNEL TO THE USER DEVICE IN PLACE OF THE CONVERSATIONAL ENTITY COMMUNICATION 408

COMMUNICATION RESOURCE ALLOCATION

BACKGROUND

The present invention generally relates to communication networks and computing systems, and more specifically, to computer systems, computer-implemented methods, and computer program products configured to utilize analysis for communication resource allocation.

Communication networks and computing systems have not only expanded in their sizes, such as geographical area and number of terminals, but also in the variety of services, users, and deployment environments. The purpose of resource allocation in such environments is to intelligently assign the limited available resources among terminals/clients in an efficient way to satisfy service to end users. With the dramatic developments and fast evolution of communication networks and computing systems, resource allocation continues to be the fundamental challenge, because better quality of service is required with the increasing demand for bandwidth-hungry and/or computation-intensive services. In particular, resource allocation has to cope with various new emerging system architectures which have can distributed intelligence in a multitude of devices operating autonomously, and this enables shifting traditional centralized allocation mechanisms into fully distributed solutions.

SUMMARY

Embodiments of the invention are directed to a computer-implemented method for communication resource allocation. A non-limiting example of the method includes monitoring, by a computer system, a communication between a conversational entity communication channel and a user device and determining a type of the communication associated with the user device based on the communication. Also, the method includes determining a replacement communication channel to replace the conversational entity communication channel, in response to the type of the communication and coupling the replacement communication channel to the user device in place of the conversational entity communication channel.

Embodiments of the invention are directed to system for communication resource allocation. A non-limiting example of the system includes a processor, and memory coupled to the processor and comprising computer-executable instructions that, when executed by the processor, cause the processor to perform a method. A non-limiting example of the method includes monitoring, by the processor, a communication between a conversational entity communication channel and a user device and determining a type of the communication associated with the user device based on the communication. Also, the method includes determining a replacement communication channel to replace the conversational entity communication channel, in response to the type of the communication and coupling the replacement communication channel to the user device in place of the conversational entity communication channel.

Embodiments of the invention are directed to a computer program product for communication resource allocation, the computer program product comprising a computer readable storage medium having program instructions embodied therewith, wherein the computer readable storage medium is not a transitory signal per se, the program instructions executable by a computer to cause the computer to perform a method. A non-limiting example of the method includes monitoring, by the computer, a communication between a conversational entity communication channel and a user device and determining a type of the communication associated with the user device based on the communication. Also, the method includes determining a replacement communication channel to replace the conversational entity communication channel, in response to the type of the communication and coupling the replacement communication channel to the user device in place of the conversational entity communication channel.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention are described herein with reference to the related drawings.

Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, a chatbot (also known as a smartbots, talkbot, chatterbot, Bot, IM bot, interactive agent, conversational interface or artificial conversational entity) is a computer program or an artificial intelligence which conducts a conversation via auditory or textual methods. Such programs are often designed to convincingly simulate how a human would behave as a conversational partner, thereby passing the Turing test. Chatbots are typically used in dialog systems for various practical purposes including customer service or information acquisition. Some chatbots use sophisticated natural language processing systems, but many simpler systems scan for keywords within the input, then pull a reply with the most matching keywords, or the most similar wording pattern, from a database.

Turning now to an overview of the aspects of the invention, one or more embodiments of the invention provide communication resource allocation using a chatbot hybrid system. A monitoring computer system is provided which monitors a communication interaction between a chatbot and an end user, and the monitoring computer system determines when additional communication resources should be allocated to the end user in place of the chatbot.

The monitoring computer system is configured to presume that chatbots are more likely to become frustrated as compared with a live human interaction, and the customer would benefit more live human interaction. To improve customer satisfaction, the monitoring computer system sits alongside a chatbot system to observe which end users (e.g., customers) are becoming frustrated, disengaged, and/or dissatisfied while currently using the chatbot system, and the monitoring computer system can prioritize long term customers and high volume customers. The monitoring computer system is configured to utilize a prioritized ranking to decide which free (non-chatbot) communication channels (e.g., voice channels to customer service agents, video channels to customer service agents, text channels to customer service agents, etc.) are assigned to users (e.g., customers) and which users remain in the chatbot system.

Chatbot systems can be used as part of communications systems which are designed to support reduced resource costs and improve self-service efficiencies while delivering a positive customer experience. Chabot systems are generally designed to be "human-like" in their interactions with their customers. Humans make decisions based on a wide range of information, from corporate policies, previous experience, and even just "gut feel." It is hopeful that chatbots are similarly able to make decisions to questions often without the "humanity" of a human. This means that the "correct" answer to a customer question might not be the best decision for the communication system/network and not always what a customer wants. For example, if a customer asks "how do I cancel my account," a chatbot system might respond to this inquiry by attempting to answer the question. However, embodiments of the invention are configured to analyze customer response to identify customer intent and access a broader range of responses than simply attempting to answer each question. In the above-described example, embodiments of the invention analyze the customer question to identify that the customer has indicated that they might be considering cancelling their account and considers whether a better response to the customer's inquiry might be to redirect the user to a human agent (i.e., a customer service agent/representative) who can address the root questions. Embodiments of the invention are configured to identify customer communications that are driven from frustration and identify a customer that is really seeking better service or a sympathetic ear to his/her issue without directly expressing that sentiment. Embodiments of the invention provide a chatbot system configured to respond appropriately to this question, not merely by searching documentation, but by understanding the customer and communications system contexts (e.g., not all clients have the same footing within the communications system/network). Human agents (i.e., customer service representatives/agents) are a constrained resource particularly when a prompt response is required. Many communications networks/systems (or organizations) categorize their customers by a level such as Gold/Silver/Bronze based on measures such as customer account size, customer length of association, and/or by a customer paying for this level of service. Accordingly, in embodiments of the invention, a monitoring computer system is provided that is configured to determine when the communication interaction between a chatbot and the end user (e.g., customer) should be escalated to utilize additional communication resources. Also, the monitoring computer system has a condition that includes organization preferences such that the decision to escalate can be influenced by the corporate policy.

Figure 1:
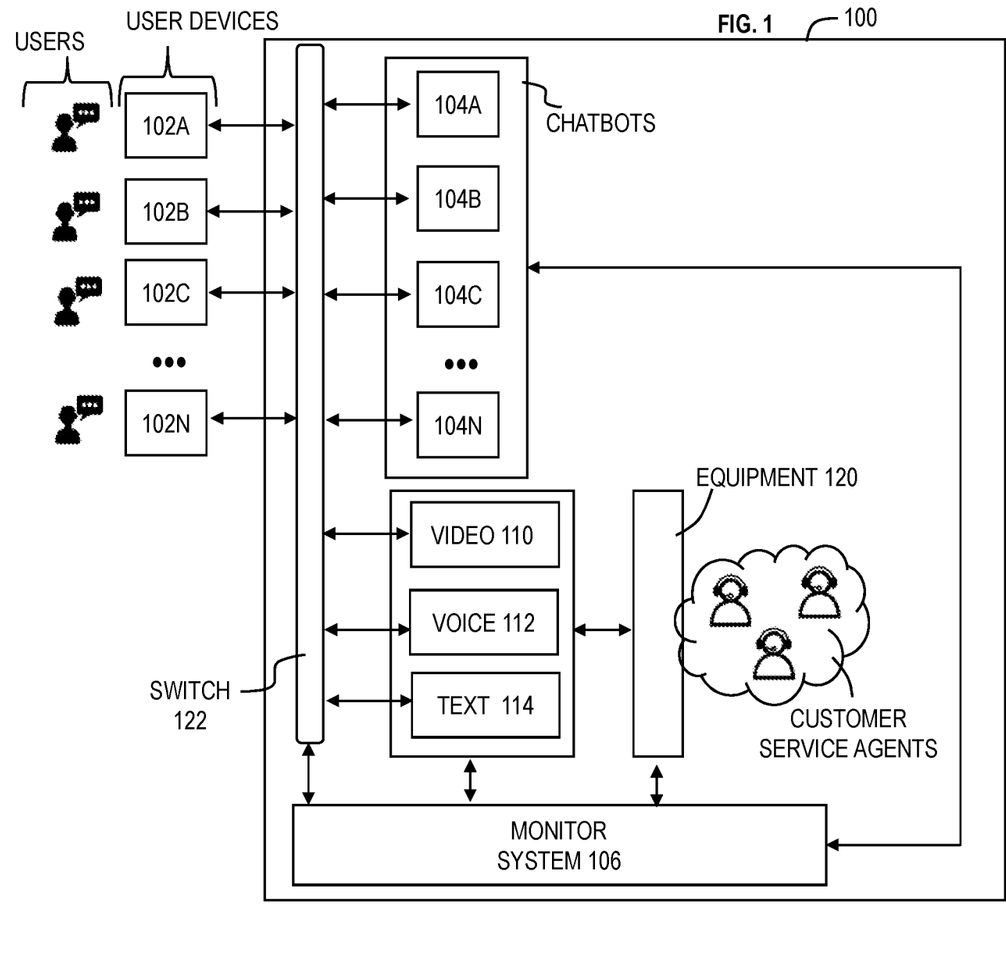
FIG. 1 depicts a communication system/network according to embodiments of the invention.
Figure 5:
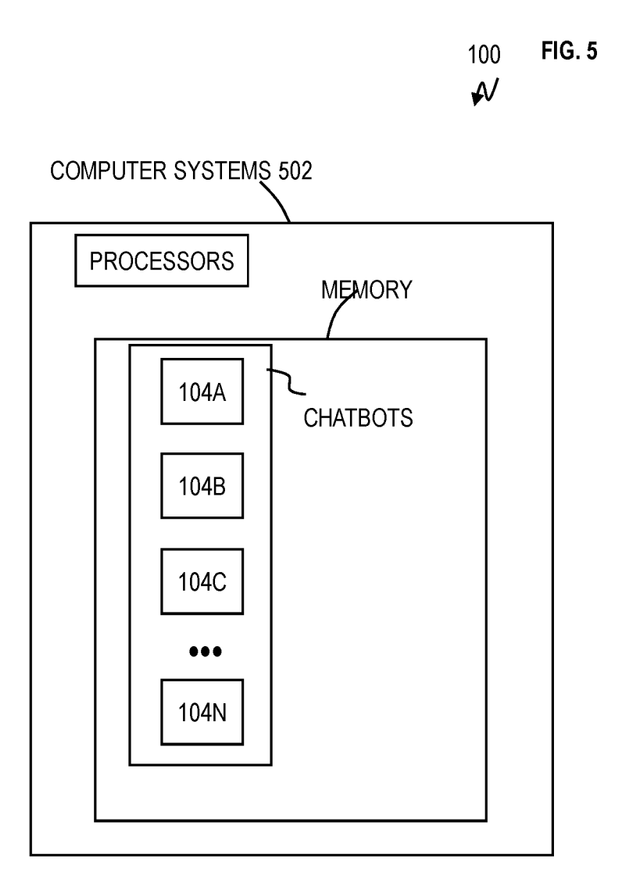
FIG. 5 depicts an example of one or more computer systems coupled to the communication system/network to support chatbots according to embodiments of the invention.

Turning now to a more detailed description of aspects of the present invention, FIG. 1 depicts a communication system/network 100 according to embodiments of the invention. The communication system/network 100 includes chatbots 104A, 104B, 104C, . . . 104N (generally referred to as chatbots 104, where N is the last chatbot) which can each conduct interactive communications with respective users on user devices 102A, 102B, 102C, . . . 102N (generally referred to as user devices 102, where N is the last user device). The chatbots 104 can be executed or run on one or more computer systems 502 in (and/or coupled to) the communication system/network 100 as depicted in FIG. 5. The computer systems 502 include software and hardware to function and support the chatbots 104. The user devices 102 are representative of various communication devices, including smartphones or cellphones, laptops, personal computers, hand held device, smart home devices, etc.

The chatbots 104 each utilize a communication channel having a predefined amount of resources of the communication system/network 100. Other types of interactive communications require a different amount of resources and these interactive communications can include video communications 110, voice communications 114, and text communications 114 all of which require customer service agents (i.e., human agents). The video communications 110, voice communications 114, and text communications 114 are each a communication channel that utilizes the limited resources in the communication system/network 100.

A monitoring computer system 106 is configured to monitor (i.e., listen to) each live communication interaction between chatbots 104A-104N and respective user devices 102A-102N of users via one or more communication switches 122, and the monitoring computer system 106 determines when additional communication resources should be allocated to the end user. For example, the monitoring computer system 106 determines when any one or more of the video communications 110, voice communications 114, and text communications 114 along with a customer service agent should be operatively connected to the user of a user device 102 in place of the chatbot 104. Further, the functions of the chatbots 104 on computer system 502 and the monitoring computer system 106 can be integrated in accordance with one or more embodiments of the invention. As such, the chatbots 104 themselves can include and/or have access to the features of the monitoring computer system 106, such that the chatbots 104 can act as the orchestration mechanism for processing the content as discussed herein (via the intent analyzer 210, sentiment analyzer 214, tone analyzer 214, etc. depicted in FIG. 2).

Figure 6:
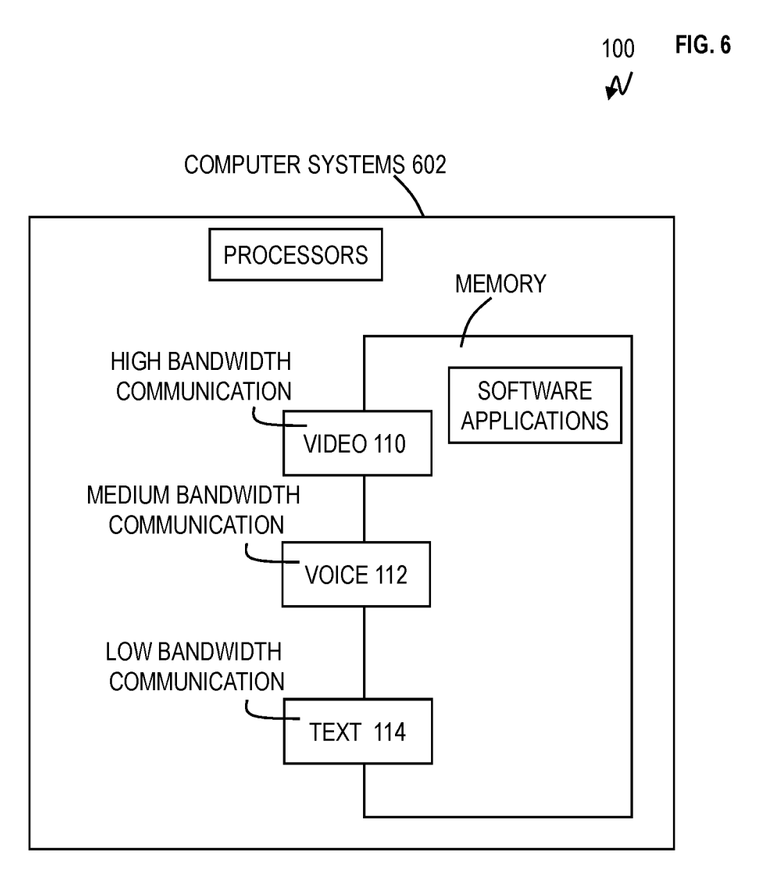
FIG. 6 depicts an example of one or more computer systems coupled to the communication system/network to support video, voice, and text communications according to embodiments of the invention.

The resources in the communication network/system 100 are limited, and at times, there can be more potential user devices 102 of users than available resources in the communication network/system 100. The video communications 110, voice communications 112, and text communications 114 are defined as additional/replacement communication channels for a customer service agent to interactively communicate with a user on user device 102. Accordingly, the monitoring computer system 106 is configured to determine which additional/replacement communication channel is selected to communicate with the user on user device 102 instead of the chatbot 104. The video communications channel 110, voice communications channel 112, and text communications channel 114 can include and/or be coupled to one or more computer systems 602 as depicted in FIG. 6. The computer systems 602 include the software and hardware to function as and support video communications channel 110, voice communications channel 112, and text communications channel 114. The computer systems 602 includes (and/or couple to) communication circuits (in the communication network/system 100) for controlling the video communications channel 110, the voice communications channel 112, and the text communications channel 114. The video communications channel 110 (i.e., video and audio) uses and requires the highest bandwidth (as compared to voice and text communications and chatbot communications), the voice communications channel 112 (i.e., audio) uses and requires a medium bandwidth, and the text communications channel 114 (e.g., text, links to URLs, pictures, etc.) uses and requires a low bandwidth. The bandwidth is over the physical communication lines and related communication circuits in and/or coupled to the computer systems 602 of the communication network/system 100. Bandwidth refers to a range within a band of frequencies or wavelengths. Bandwidth is also the amount of data that can be transmitted in a fixed amount of time. For digital devices, the bandwidth is usually expressed in bits per second (bps) or bytes per second. For analog devices, the bandwidth is expressed in cycles per second, or hertz (Hz).

A communication channel or simply channel refers to a physical transmission medium such as a wire, and/or to a logical connection over a multiplexed medium such as a radio channel in telecommunications and computer networking. A communication channel is used to convey an information signal, for example, a digital bit stream, from one or several senders (or transmitters) to one or several receivers. A communication channel has a certain capacity for transmitting information, often measured by its bandwidth in hertz (Hz) and/or its data rate in bits per second. Communicating data from one location to another requires some form of pathway or medium. These pathways, called communication channels, use two types of media: cable (twisted-pair wire, cable, and fiber-optic cable) and broadcast (microwave, satellite, radio, and infrared). Cable or wire line media use physical wires of cables to transmit data and information.

The switch 122 can be controlled by the monitoring computer system 106 such that the monitoring computer system 106 can operatively connect and disconnect as desired a particular user device 102A to a particular communication channel, such as a chatbot 104, video communication 110, voice communication 112, and/or text communication 114. The switch 122 is a telecommunications switch. The switch 122 can include and/or couple to a communication circuit. The switch 122 includes the functionality, operations, hardware, software, etc., of circuit switches, network/packet switches, virtual switches, etc.

Circuit switching is a method of implementing a telecommunications network in which two network nodes establish a dedicated communications channel (circuit) through the network before the nodes may communicate. The circuit guarantees the full bandwidth of the channel and remains connected for the duration of the communication session. The circuit functions as if the nodes were physically connected as with an electrical circuit. A network switch (also called switching hub, bridging hub, officially MAC bridge) is a computer networking device that connects devices together on a computer network by using packet switching to receive, process, and forward data to the destination device. Packet switching is a method of grouping data that is transmitted over a digital network into packets. Packets are made of a header and a payload. Data in the header are used by networking hardware to direct the packet to its destination where the payload is extracted and used by application software. Packet switching is the primary basis for data communications in computer networks worldwide.

The customer service agents each utilize telecommunications equipment 120 to communicate over the channels for video communications 110, voice communications 112, and text communications 114. Telecommunications equipment (also telecoms equipment or communications equipment) is hardware used for the purposes of telecommunications. This hardware (which can be video equipment (including cameras), audio equipment (including microphones, speakers, etc.), headsets, display/touch screens) allows the customer service agents to operatively connect to video communications channel 110, voice communications channel 112, and text communications channel 114 in order to communicate with the users of user devices 102.

Figure 2:
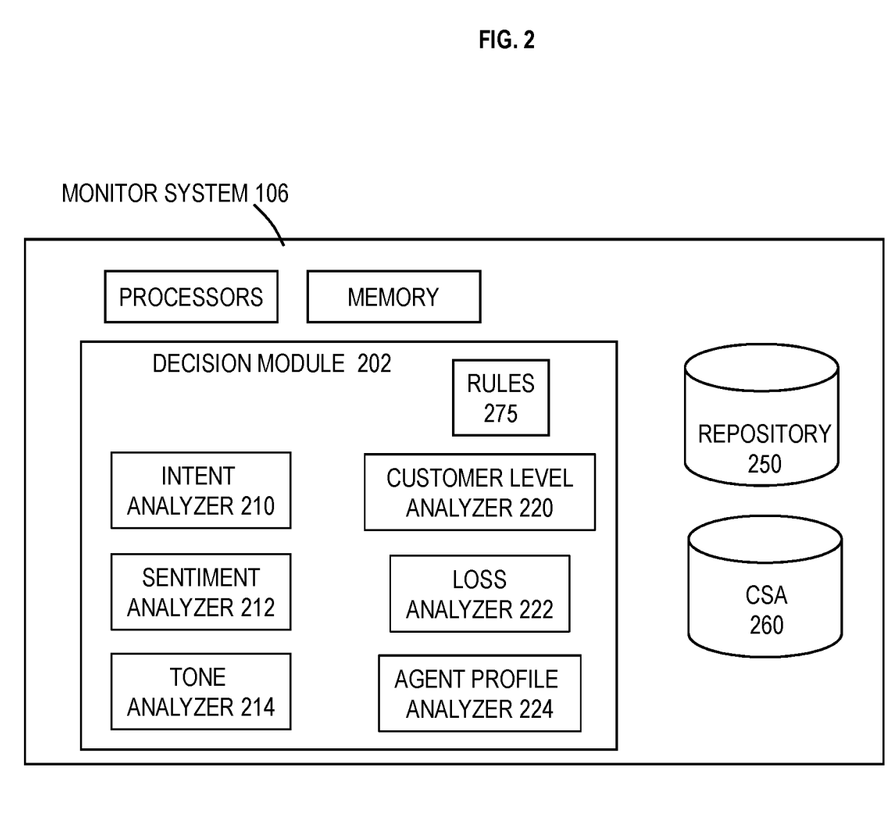
FIG. 2 depicts details of a monitoring computer system according to embodiments of the invention.
Figure 3:
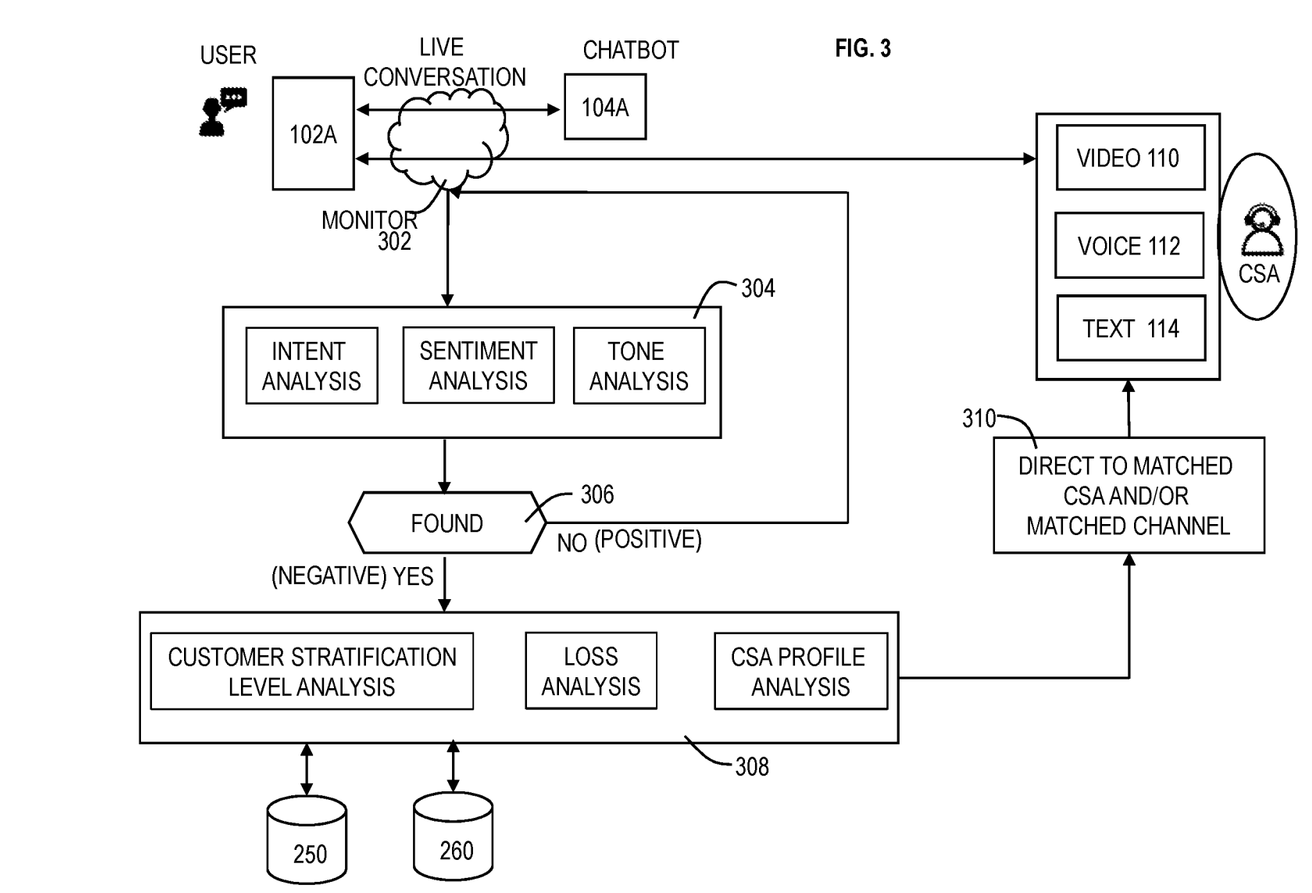
FIG. 3 depicts monitoring an interactive communication between a user device and a chatbot and changing the communication channel according to embodiments of the invention.

FIG. 2 depicts further details of the monitoring computer system 106 according to embodiments of the invention. FIG. 3 depicts an example of monitoring an interactive communication between a user device 102 and a chatbot 104 and changing the communication channel according to embodiments of the invention. FIG. 3 is a flow diagram of actions performed by the monitoring computer system 106. This scenario describes the user device 102A communicating with the chatbot 104A, but applies to other user devices 102 and chatbots 104. At block 302, the monitoring computer system 106 is configured to monitor the communication (i.e., a live conversation) between a customer on user device 102A and the chatbot 104A. While listening to the conversation and/or viewing the user, the monitoring computer system 106 can obtain the user's names, password, government identification number, account number, etc., to identify the user, which will be utilized to obtain further information regarding the user below.

To determine the behavior of the customer for user 102A, the monitoring computer system 106 is configured to perform one or more of an intent analysis using an intent analyzer 210, a sentiment analysis using sentiment analyzer 212, and/or a tone analysis using tone analyzer 214 of a decision module 202 of the monitoring computer system 106 at block 304. There can be various ways of implementing the decision module 202. The decision module 202 can be an application specific integrated circuit (ASIC), field-programmable gate arrays (FPGA), etc. Also, the decision module 202 can include software having computer-executable instructions to function as discussed herein. Continuing the scenario, while listening to the live conversation between the user of user device 102A and the chatbot 104A of the communication network/system 100, the intent analyzer 210 is configured to determine what the customer desires to do or intends to accomplish. For example, the intent analyzer 210 is configured to determine that the customer wishes to request technical support for a product, open another account, close/cancel my account, upgrade my account, ping my phone, check my Internet connectivity, pay my bill, etc. The intent analyzer 210 can listen or parse for keywords, phrases, etc., to make a determination of intention. Based on the intent analyzer 210 determining a negative intent to, for example, such as to end service, cancel account, etc., the monitoring computer system 106 is configured to determine a negative intent for the customer as it relates to the communications network/system (or organization). As examples of negative intent recognized by the intent analyzer 210, the user might indicate "I want to cancel this service" or "I am not happy with the service". Based on the intent analyzer 210 determining a positive intent to, for example, such as to request a new service, open an account, etc., the monitoring computer system 106 is configured to determine a positive intent for the customer as it relates to the communications network/system. Further, the intent analyzer 210 can be a custom natural language classifier which is particularly trained to identify both the positive and the negative intents.

While listening to and/or viewing the live conversation between the user of user device 102A and the chatbot 104A of the communication network/system 100, the sentiment analyzer 212 is configured to determine the sentiment or mood of the customer. For example, the sentiment analyzer 212 is configured to determine whether the customer has a (more) positive sentiment or a (more) negative sentiment. This negative sentiment or the positive sentiment can be determined based on a scale where predetermined words from a customer are classified/assigned as positive words or negative words, and each positive word is given a positive score (+10) and negative word is given a negative score (e.g., −10). When the sentiment analyzer 212 adds the positive and negative scores, and the total score is below zero, the sentiment analyzer 212 determines that a negative sentiment is found. Otherwise, the intent analyzer 212 determines a neutral or positive sentiment. Further, facial expressions of the user can be accounted for when determining the positive or negative words.

While listening to the live conversation between the user of user device 102A and the chatbot 104A of the communication network/system 100, the tone analyzer 214 is configured to determine the tone, personality, and emotional state of the customer. For example, the tone analyzer 214 is configured to determine that the customer is pleased, frustrated, excited, angry, happy, sarcastic, etc., by listening or parsing for keywords. The tone analyzer 214 is configured to determine a positive tone for the customer or a negative tone based on hearing more positive words or more negative words. The tone analyzer 214 can convert speech-to-text, and the tone analyzer uses linguistic analysis to detect joy, fear, sadness, anger, analytical, confident and tentative tones found in the text. For example, the tone analyzer 214 may utilize and/or incorporate the IBM Watson™ Tone Analyzer service which uses linguistic analysis to detect emotional and language tones in written text. The service can analyze tone at both the document and sentence levels. The tone analyzer 214 can receive text such as in JavaScript Object Notation (JSON), plain text, and/or HTML input that contains text to the service. Using keywords and filters, the tone analyzer 214 can return (JSON) results that report the tone of the input from the user (e.g., users utilizing user devices 102). Particularly, the tone analyzer 214 is configured to algorithmically calculate the tone of text.

At block 306, the monitoring computer system 106 is configured to check whether any one or more of the intent analyzer 210, sentiment analyzer 212, and/or tone analyzer 214 is negative communication, such as a negative intent determined by the intent analyzer 210, a negative sentiment determined by the sentiment analyzer 212, and/or a negative tone determined by the tone analyzer 214. If none are negative communications, then the monitoring computer system 106 continues monitoring at block 302. If any of the intent analyzer 210, sentiment analyzer 212, and/or tone analyzer 214 is determined to be a negative communication, the monitoring computer system 106 is configured to proceed to block 308.

At block 308, the monitoring computer system 106 is configured perform analysis which is used to determine the additional communication channel to operatively connect to the customer of user device 102A. Various factors can be utilized to determine which communication channels (e.g., video communication 110, voice communication 112, and/or text communication channel 114) to utilize for communicating with the user of user device 102A in place of the chatbot 104A. The customer stratification level analyzer 220 is configured to determine a level for the user of device 102A. The level can be a stratification level of a highest level (e.g., gold), middle level (e.g., silver), and lower level (e.g., bronze) based on criteria in repository 250 (e.g., one or more databases). The repository 250 can include customer information, organization policy, regulations, etc. The customer stratification level analyzer 220 is configured to use account size, value, etc., to determine the stratification level for the user of user device 102A. For example, an account size over a high predefined amount is determined to be the highest level (e.g., gold), an account size at or below a low predefined amount is determined to be lower level (e.g., bronze), and an account size between the high predefined amount and the low predefined amount is determined to be the middle level (e.g., silver). Examples of the account size for a customer can include the amount of resources (e.g., servers, memory, processors, bandwidth, etc.) assigned in a cloud based system of the computer network/system 100, amount of resources (e.g., products, merchandise, etc.) in a warehouse, amount of resources (e.g., physical and/or electronic money/currency) in a financial institute, etc. The account is not meant to be limited. The stratification level is passed to block 310.

Continuing block 308, the loss analyzer 222 is configured to determine a potential loss in value if the intended action requested by the user of user device 102A is performed. The loss analyzer 222 is configured to determine a potential loss level for the user of device 102A. The potential loss level can be a highest potential loss level (e.g., critical loss), middle potential loss level, and lower potential loss level based on criteria in repository 250 (e.g., one or more databases). The loss analyzer 222 is configured to use the loss of, for example, value from the user to determine the potential loss level for the user of user device 102A. For example, the value of the customer can include the amount of resources (e.g., servers, memory, processors, bandwidth, etc.,) left unutilized in a cloud based system by the user discontinuing the service, the amount of space left empty in a warehouse by the user removing resources (e.g., products, merchandise, etc.) from the warehouse, the amount of resources (e.g., physical and/or electronic money/currency) removed from a financial institute by the user discontinuing the service, etc. The (loss) value is not meant to be limited. For example, a value for the user over a high predefined value is determined to be the highest potential loss level (e.g., critical loss), a value below a low predefined value is determined to be lower potential loss level, and a value between the high predefined value and the low predefined value is determined to be the middle potential loss level. The potential loss level (e.g., highest potential loss level (e.g., critical loss), middle potential loss level, and/or lower potential loss level) is passed to block 310.

Continuing block 308, the customer service agent analyzer 224 is configured to fetch performance history of customer service agents from a customer service agent repository 260 and obtain the respectively availability of the customer service agents. The customer service agents are ranked from 1 to 10, with 10 being the best/highest (i.e., most effective) and 1 being the lowest (i.e., least effective). The available customer service agents and their respective rankings are passed to block 310. As one example, the ranking depends on how well the service agent could minimize the overall potential loss. The overall potential loss is proportional to the multiplication of the stratification level of the customer and the potential loss value of the intended action of the customer. The ranking of the service agent will be higher if he has achieved the lower overall potential loss.

At block 310, the decision module 202 of the monitoring computer system 106 is configured to determine which additional communication channel to operatively connect to the customer of user device 102A based on the determined stratification level (e.g., highest level (e.g., gold), middle level (e.g., silver), and lower level (e.g., bronze)) and/or the potential loss level (e.g., highest potential loss level (e.g., critical loss), middle potential loss level, and/or lower potential loss level), along with determining the ranked customer service agent to connect to the user device 102A via the communication channel. The decision module 202 is configured to follow rules 275 to determine the additional communication channel to operatively connect to the customer of user device 102A and to determine which of the customer service agents to select for the user, according to the determined stratification level and/or determined potential loss level associated with the user of the user device 102A. For example, for the user/customer having a stratification level of the highest level (e.g., gold) and/or having the potential loss level of the highest potential loss level (e.g., critical loss), the decision module 202 is configured to determine that a customer service agent having at least an 8 ranking (e.g., 8 to 10) is required in rules 275. Additionally, the decision module 202 determines that video communication channel 110 is required for stratification level of the highest level (e.g., gold) and/or the potential loss level of the highest potential loss level (e.g., critical loss) according to rule 275. In some implementations, the decision module 202 can also use the voice communication channel 112 in this case when the video communication channel 110 is unavailable and/or as an alternative to the video communication channel 110.

For the user/customer having a stratification level of the middle level (e.g., silver) and/or having the potential loss level of the middle potential loss level, the decision module 202 is configured to determine that a customer service agent having at least a 5 ranking (e.g., 5 to 10) is required in rules 275. Additionally, the decision module 202 determines that voice communication channel 112 is required for stratification level of the middle level (e.g., silver) and/or the potential loss level of the middle potential loss level according to rule 275. In some implementations, the decision module 202 can escalate to the video communication channel 110 when the customer has at least a predefined amount of years of service with the communication network/system 100.

For the user/customer having a stratification level of the lower level (e.g., bronze) and/or having the potential loss level of the lower potential loss level, the decision module 202 is configured to determine that a customer service agent having at least a 3 ranking (e.g., 3 to 10) is required in rules 275. Additionally, the decision module 202 determines that voice communication channel 112 and/or text communication can be utilized for stratification level of the lower level (e.g., bronze) and/or the potential loss level of the lower potential loss level according to rule 275. In this case, there is no escalation to the by the decision module 202 to the video communication channel 110 even when the customer has at least a predefined amount of years of service with the communication network/system 100.

The monitoring computer system 106 is configured to connect the determined additional/replacement communication channel, for example, video communication 110, voice communication 112, and/or text communication channel 114 (in place of the chatbot (channel) 104A) to operatively connect to the customer of user device 102A, and the determined ranked customer service agent (e.g., ranked 1-10).

Figure 4:
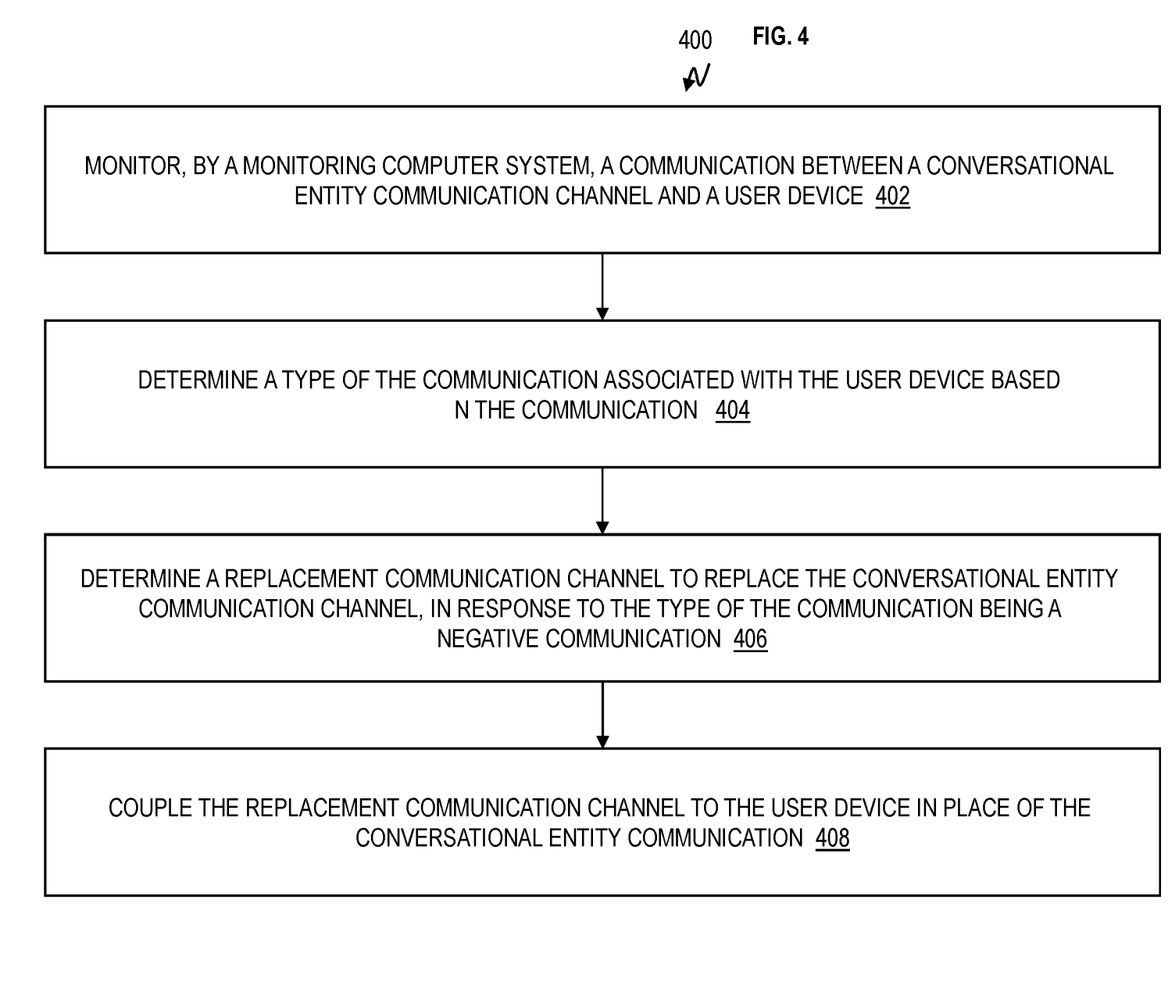
FIG. 4 depicts a flowchart of a computer-implemented method for communication resource allocation according to embodiments of the invention.

FIG. 4 depicts a flowchart 400 of a computer-implemented method for communication resource allocation according to embodiments of the invention. At block 402, the monitoring computer system 106 is configured to monitor a communication between a conversational entity communication channel (e.g., chatbot 104) and a user device 102. At block 404, the monitoring computer system 106 is configured to determine a type of the communication associated with the user device 102 based on the communication. At block 406, the monitoring computer system 106 is configured to determine a replacement communication channel to replace the conversational entity communication channel, in response to the type of the communication being a negative communication. At block 408, the monitoring computer system 106 is configured to couple the replacement communication channel to the user device 102 in place of the conversational entity communication. For example, the monitoring computer system 106 is configured to cause the switch 122 to couple the video communication channel 110, voice communication channel 112, and/or text communication channel 114.

Determining the type of the communication associated with the user device 102 based on the communication includes determining a behavior of a user of the user device 102. The communication is a live conversation between a user of user device 102 and a conversational entity (e.g., chatbot 104). Determining the type of the communication associated with the user device 102 includes performing an intent analysis (via intent analyzer 210 of the decision module 202) of a user of the user device. The computer monitoring system 106 is configured to determine a negative intent of the user from the intent analysis (via intent analyzer 210 of the decision module 202) in order to determine the type of the communication is the negative communication.

Determining the type of the communication associated with the user device includes performing a sentiment analysis (via sentiment analyzer 212 of the decision module 202). The computer monitoring system 106 is configured to determine a negative sentiment of the user from the sentiment analysis (via sentiment analyzer 212 of the decision module 202) in order to determine the type of the communication is the negative communication.

Determining the type of the communication associated with the user device includes performing a tone analysis (via tone analyzer 214 of the decision module 202). The computer monitoring system 106 is configured to determine a negative tone of the user from the tone analysis (via tone analyzer 214 of the decision module 202) in order to determine the type of the communication is the negative communication.

Determining the replacement communication channel to replace the conversational entity communication channel in response to the type of the communication being the negative communication includes selecting (by the monitoring computer system 106) between a video communication channel 110, a voice communication channel 112, and a text communication channel 114. The replacement communication channel is determined according to a stratification level (via the customer level analyzer 220) for a user of the user device 102. The replacement communication channel is determined according to a potential loss level (via the loss analyzer 222) for a user of the user device 102. The monitoring computer system 106 is configured to select a customer service agent for the replacement communication channel, where a ranking of the customer service agent is according to a stratification level and a potential loss level for a user of the user device.

Embodiments of the invention provide many technical benefits and advantages. Embodiments of the invention provide techniques for improving the allocation of resources when resources are limited in a computer network/system. Additionally, it should be appreciated that embodiments of the invention can positively impact revenue of an entity (such as an entity related to the communication network/system) by preventing revenue loss from customers who should be appropriately directed from a chatbot system to a replacement communication channel as discussed herein.

Figure 7:
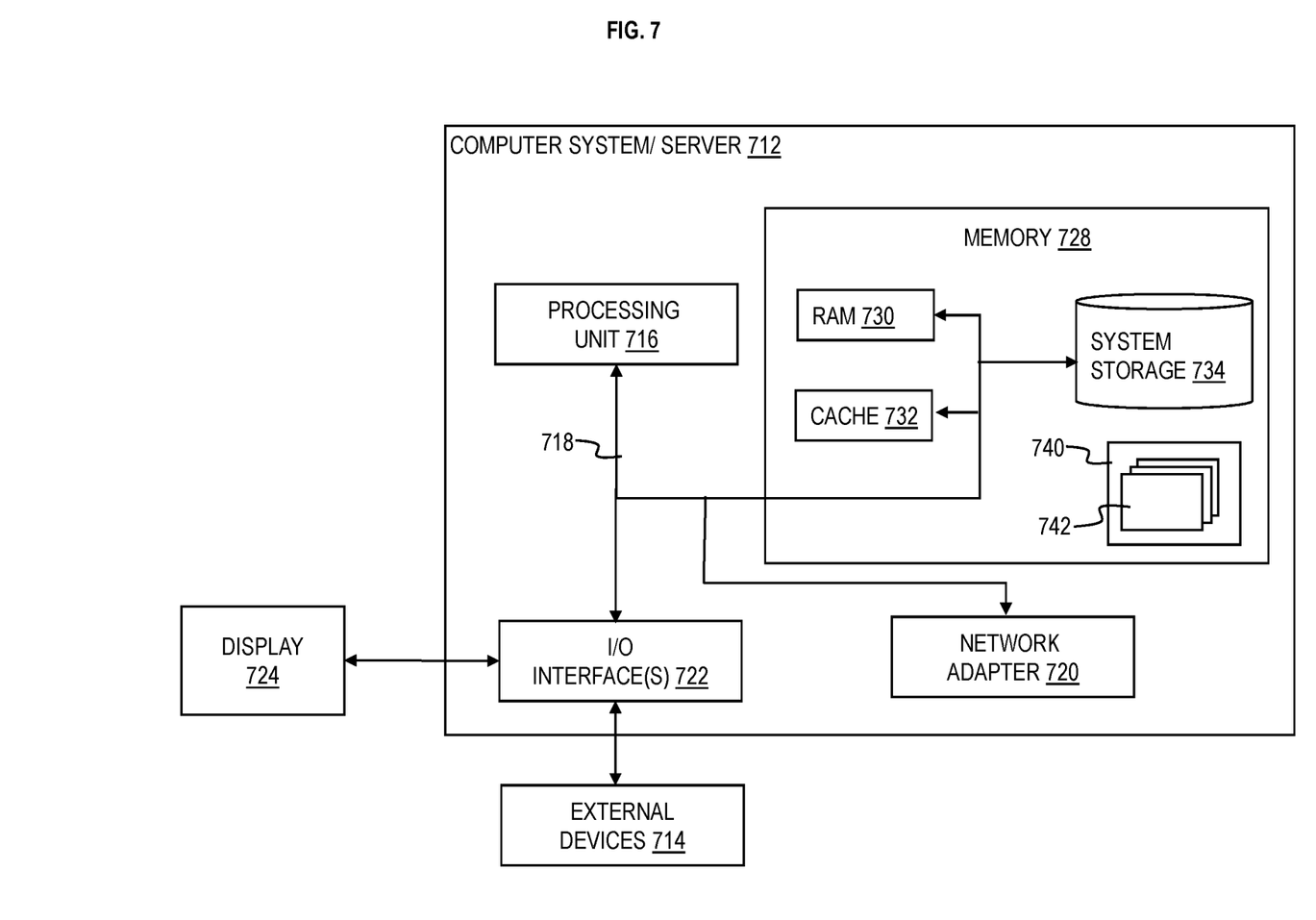
FIG. 7 depicts a schematic of an example computing system having elements and functions which operate as discussed herein in FIGS. 1-6 according to embodiments of the invention.

FIG. 7 depicts a schematic of an example computing system 712 according to embodiments of the present invention. The computer system/server 712 can be operational with numerous other general purpose or special purpose computing system environments or configurations. The computer system/server 712 can be representative of various types of computer systems on which communication functions can run in the communication system/network 100. The functions and capabilities of computing system 712 can be utilized in FIGS. 1-6 to implement features of the chatbots 104, video communications 110, voice communication 112, text communication 114, monitoring computer system 106, equipment 120, computer systems 502, 602, user devices 102, etc., according to embodiments of the invention.

Examples of well-known computing systems, environments, and/or configurations that can be representative of and/or include elements of computer system/server 712 include, but are not limited to, personal computer systems, phones (e.g., cellphones, smart phones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 712 may include, but are not limited to, one or more processors or processing units 716, a system memory 728, and a bus 718 that couples various system components including system memory 728 to processor 716. Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media. The system memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. Memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for communication resource allocation, the method comprising:
    monitoring, by a computer system, a communication between a conversational entity communication channel and a user device;
    determining a type of the communication associated with the user device based on the communication;
    determining a replacement communication channel to replace the conversational entity communication channel, in response to the type of the communication and a predefined level, selected from a plurality of predefined levels related to a user account size, associated with the user device, the replacement communication channel utilizing more resources than the conversational entity communication channel thereby increasing an amount of bandwidth allotted for the communication with the user device; and
    coupling the replacement communication channel to the user device in place of the conversational entity communication channel, wherein:
    a customer service agent is selected for the replacement communication channel; and
    a ranking of the customer service agent is according to a stratification level and a potential loss level for a user of the user device.

2. The computer-implemented method of claim 1, wherein determining the type of the communication associated with the user device based on the communication comprises determining a behavior of the user of the user device.

3. The computer-implemented method of claim 1, wherein the communication comprises a live conversation between the user of the user device and a conversational entity.

4. The computer-implemented method of claim 1, wherein determining the type of the communication associated with the user device comprises performing an intent analysis of the user of the user device.

5. The computer-implemented method of claim 4 further comprising determining a positive intent or a negative intent of the user from the intent analysis in order to determine the type of the communication is a positive communication or a negative communication, respectively.

6. The computer-implemented method of claim 1, wherein determining the type of the communication associated with the user device comprises performing a sentiment analysis.

7. The computer-implemented method of claim 6 further comprising determining a positive sentiment or a negative sentiment of the user from the sentiment analysis in order to determine the type of the communication is a positive communication or a negative communication, respectively.

8. The computer-implemented method of claim 1, wherein the plurality of predefined levels are each associated with predefined quantities.

9. The computer-implemented method of claim 1 further comprising determining a positive tone or a negative tone of the user from a tone analysis in order to determine the type of the communication is a positive communication or a negative communication, respectively, wherein determining the type of the communication associated with the user device comprises performing the tone analysis.

10. The computer-implemented method of claim 1, wherein determining the replacement communication channel to replace the conversational entity communication channel in response to the type of the communication comprises selecting from among a video communication channel, a voice communication channel, and a text communication channel.

11. A system for communication resource allocation, the system comprising:
a processor; and
memory coupled to the processor and comprising computer-executable instructions that, when executed by the processor, cause the processor to perform a method comprising:
monitoring, by the processor, a communication between a conversational entity communication channel and a user device;
determining a type of the communication associated with the user device based on the communication;
determining a replacement communication channel to replace the conversational entity communication channel, in response to the type of the communication and a predefined level, selected from a plurality of predefined levels related to a user account size, associated with the user device, the replacement communication channel utilizing more resources than the conversational entity communication channel thereby increasing an amount of bandwidth allotted for the communication with the user device; and
coupling the replacement communication channel to the user device in place of the conversational entity communication channel, wherein:
a customer service agent is selected for the replacement communication channel; and
a ranking of the customer service agent is according to a stratification level and a potential loss level for a user of the user device.

12. The system of claim 11, wherein determining the type of the communication associated with the user device based on the communication comprises determining a behavior of the user of the user device.

13. The system of claim 11, wherein the communication comprises a live conversation between the user of the user device and a conversational entity.

14. The system of claim 11, wherein determining the type of the communication associated with the user device comprises performing an intent analysis of the user of the user device.

15. A computer program product for communication resource allocation, the computer program product comprising a computer readable storage medium having program instructions embodied therewith, wherein the computer readable storage medium is not a transitory signal per se, the program instructions executable by a computer to cause the computer to perform a method comprising:
monitoring, by the computer, a communication between a conversational entity communication channel and a user device;
determining a type of the communication associated with the user device based on the communication;
determining a replacement communication channel to replace the conversational entity communication channel, in response to the type of the communication and a predefined level, selected from a plurality of predefined levels related to a user account size, associated with the user device, the replacement communication channel utilizing more resources than the conversational entity communication channel thereby increasing an amount of bandwidth allotted for the communication with the user device; and
coupling the replacement communication channel to the user device in place of the conversational entity communication channel, wherein:
a customer service agent is selected for the replacement communication channel; and
a ranking of the customer service agent is according to a stratification level and a potential loss level for a user of the user device.

16. The computer program product of claim 15, wherein determining the type of the communication associated with the user device based on the communication comprises determining a behavior of the user of the user device.

17. The computer program product of claim 15, wherein the communication comprises a live conversation between the user of the user device and a conversational entity.

* * * * *